US012587858B2

(12) United States Patent
Sedin et al.

(10) Patent No.: US 12,587,858 B2
(45) Date of Patent: Mar. 24, 2026

(54) OBSCURED DEVICE IDENTITY IN WIRELESS TRANSMISSIONS

(71) Applicant: Telefonaktiebolaget LM Ericsson (publ), Stockholm (SE)

(72) Inventors: Jonas Sedin, Brentford (GB); Sebastian Max, Cologne (DE); Dennis Sundman, Sollentuna (SE); Miguel Lopez, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 81 days.

(21) Appl. No.: 18/035,821

(22) PCT Filed: Nov. 4, 2021

(86) PCT No.: PCT/EP2021/080685
§ 371 (c)(1),
(2) Date: May 8, 2023

(87) PCT Pub. No.: WO2022/101087
PCT Pub. Date: May 19, 2022

(65) Prior Publication Data
US 2025/0024263 A1     Jan. 16, 2025

Related U.S. Application Data

(60) Provisional application No. 63/112,785, filed on Nov. 12, 2020.

(51) Int. Cl.
*H04W 12/122*     (2021.01)
*H04W 12/02*     (2009.01)
(Continued)

(52) U.S. Cl.
CPC ......... *H04W 12/122* (2021.01); *H04W 12/02* (2013.01); *H04W 12/71* (2021.01); *H04W 84/12* (2013.01)

(58) Field of Classification Search
CPC ... H04W 12/122; H04W 12/02; H04W 12/71; H04W 84/12; H04L 2101/622; H04L 61/5038
See application file for complete search history.

(56) References Cited

U.S. PATENT DOCUMENTS

2012/0257753 A1*   10/2012   Ochikubo ............. H04W 12/02
                                                  380/270
2015/0026363 A1*    1/2015   Wright, Sr. ......... H04L 61/5053
                                                  709/245
(Continued)

FOREIGN PATENT DOCUMENTS

EP        1379029 A1      1/2004
EP        2290904 A1      3/2011

OTHER PUBLICATIONS

Martin, Jeremy, et al. "A study of MAC address randomization in mobile devices and when it fails." arXiv preprint arXiv:1703.02874 (2017). (Year: 2017).*

(Continued)

*Primary Examiner* — Robert B Leung
(74) *Attorney, Agent, or Firm* — COATS & BENNETT, PLLC

(57)                ABSTRACT

Based on secured communication in a wireless communication system, a wireless communication device (10, 11) determines a variable association of device identification information to one or more wireless communication devices (10, 11). Based on the determined association, the wireless communication device (10, 11) controls processing of one or more wireless transmissions comprising the device identification information.

9 Claims, 9 Drawing Sheets

| Address mapping | |
|---|---|
| AP1 | $\{t_1: \text{Addr}_1, t_2: \text{Addr}_2, t_3: \text{Addr}_3, t_4: \text{Addr}_4\}$ |
| AP2 | $\{t_1: \text{Addr}_2, t_2: \text{Addr}_3, t_3: \text{Addr}_4, t_4: \text{Addr}_1\}$ |
| AP3 | $\{t_1: \text{Addr}_3, t_2: \text{Addr}_4, t_3: \text{Addr}_1, t_4: \text{Addr}_2\}$ |

(51) Int. Cl.
  *H04W 12/71*   (2021.01)
  *H04W 84/12*   (2009.01)

(56)       References Cited

U.S. PATENT DOCUMENTS

| | | | | |
|---|---|---|---|---|
| 2019/0372992 | A1* | 12/2019 | Hecker | H04L 61/5038 |
| 2020/0029376 | A1* | 1/2020 | Asterjadhi | H04W 28/04 |
| 2020/0229071 | A1* | 7/2020 | Ansley | H04W 12/75 |
| 2020/0351648 | A1* | 11/2020 | Fang | H04W 12/75 |
| 2021/0099256 | A1* | 4/2021 | Lee | H04L 1/1893 |

OTHER PUBLICATIONS

Naik, G. et al., "Performance Analysis of Uplink Multi-User OFDMA in IEEE 802.11ax", 2018 IEEE International Conference on Communications (ICC), May 20-24, 2018, pp. 1-6, IEEE.
Verma, L. et al., "Coordinated AP Time/Frequency Sharing in a Transmit Opportunity in 11be", IEEE 802.11-19/1582r0, Nov. 2019, pp. 1-12, IEEE.
Rahbari, H. et al., "Secrecy beyond Encryption: Obfuscating Transmission Signatures in Wireless Communications", IEEE Communications Magazine, Dec. 2015, pp. 54-60, IEEE.
Perahia, E. et al., "Next Generation Wireless LANS Throughput, Robustness, and Reliability in 802.11n", Cambridge University Press, Jan. 2008, pp. 1-417, Cambridge.
IEEE, "Draft Standard for Information Technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN", IEEE P802.11ax™/D6.0, Nov. 2019 (amendment to IEEE P802.11REVmd/D3.0), pp. 1-780, IEEE.
IEEE, "IEEE Standard for Information technology—Telecommunications and information exchange between systems Local and metropolitan area networks—Specific requirements, Part 11: Wireless LAN Medium Access Control (MAC) and Physical Layer (PHY) Specifications", IEEE Computer Society, New York, NY, IEEE Std 802.11-2016, pp. 1-3534.

* cited by examiner

| BW | | Reserved | STBC | Group ID | | | | | NSTS | | | Partial AID | | | | | | | | | | TXOP_PS_NOT_ALLOWED | Reserved |
|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

FIG. 3

| Format | Beam Change | UL/DL | HE-MCS | | | | | DCM | BSS Color | | | | | | Reserved | Spatial Reuse | | | | BW | GI+HE-LTF Size | | NSTS and Midamble Periodicity | |
|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

FIG. 4

| STA11  transmit address mapping | |
| --- | --- |
| STA11 | $Addr_3$, $Addr_{19}$, $Addr_{20}$, $Addr_{39}$ |

| STA11 received address mapping | |
| --- | --- |
| $Addr_1$, $Addr_{21}$, $Addr_{45}$ | AP1 |
| $Addr_2$, $Addr_9$ | STA2 |
| $Addr_4$, $Addr_{15}$, $Addr_{17}$, $Addr_{31}$ | STA3 |

| Address mapping | |
|---|---|
| AP1 | {$t_1$: Addr$_1$, $t_2$: Addr$_2$, $t_3$: Addr$_3$, $t_4$: Addr$_4$} |
| AP2 | {$t_1$: Addr$_2$, $t_2$: Addr$_3$, $t_3$: Addr$_4$, $t_4$: Addr$_1$} |
| AP3 | {$t_1$: Addr$_3$, $t_2$: Addr$_4$, $t_3$: Addr$_1$, $t_4$: Addr$_2$} |

1010 — Receive wireless transmission(s)

1020 — Send wireless transmission(s)

1030 — Determine variable association of device identification information to wireless communication device(s)

1040 — Control processing of wireless transmission(s)

1110 — Module 1:
Receiving wireless transmission(s)

1120 — Module 2:
Sending wireless transmission(s)

1130 — Module 3:
Determining variable association of
device identification information
to wireless communication device(s)

1140 — Module 4:
Controlling processing of
wireless transmission(s)

WIRELESS COMMUNICATION DEVICE

1100

OBSCURED DEVICE IDENTITY IN WIRELESS TRANSMISSIONS

TECHNICAL FIELD

The present invention relates to methods for controlling wireless transmissions and to corresponding devices, systems, and computer programs.

BACKGROUND

A technology in which a receiver tracks characteristics of received signals to infer spatial information about the environment in which the signal propagates is also denoted as "wireless sensing". Wireless sensing may for example be utilized to detect moving objects and/or locations of moving objects. It may operate in a similar manner as radar, however instead of using an active transmitter, wireless sensing is based on overhearing active transmissions from other devices. An exemplary use case of wireless sensing is presence sensing in home automations, where the information delivered by wireless sensing can be used for controlling light and/or other home automation equipment. Enabling wireless sensing is for example considered for WLAN (Wireless Local Area Network) systems according to the IEEE 802.11 standards family, e.g., as specified in "IEEE Standard for Information technology—Telecommunications and information exchange between systems Local and metropolitan area networks—Specific requirements—Part 11: Wireless LAN Medium Access Control (MAC) and Physical Layer (PHY) Specifications," in IEEE Std 802.11-2016 (Revision of IEEE Std 802.11-2012) (December 2016), in the following denoted as "IEEE 802.11 Specifications".

In current WLAN systems, wireless sensing can for example be implemented using relatively inexpensive devices which operate by monitoring changes in CSI (Channel State Information) of received in wireless transmissions. Based on signal processing and classification, the detected changes allow for detecting presence of humans or animals, detect vital signs, such as respiration patterns, and even to localize humans or animals.

Wireless sensing can operate on the basis of solicited wireless transmissions or on the basis of unsolicited wireless transmissions. In the case of solicited wireless transmissions, the device that performs the wireless sensing may trigger a wireless transmission by another device and perform the sensing on the basis of the triggered wireless transmission, or the wireless device may send a wireless transmission and request feedback on measurements on this signals from another device. This triggering or requesting of feedback may be based on corresponding control signaling. In the case of unsolicited wireless transmissions, the device performing the wireless sensing may solely rely on wireless transmissions which occur during regular operation of other devices, e.g., transmissions of payload data between other devices, without requiring any specific control signaling.

According to the IEEE 802.11 Specifications, a WLAN consists of one Access Point (AP) and one or more associated Stations (STAs). The AP is responsible to forward data from/to the wireless network via a distribution system (DS). The set of STAs together with the AP form a Basic Service Set (BSS), and the AP announces this BSS with its BSS ID in its beacons. In enhancements of the WLAN technology, it is also envisioned that multiple APs coordinate with each other to increase the performance of the network. One suggestion is that the participating APs share the same BSS ID. In this way, associated STAs are not able to identify from which AP a transmission is initiated, and the multi-AP coordination becomes transparent for the STAs—the APs form a single so-called "virtual BSS".

According to the IEEE 802.11 Specifications, various address types can be used to distinguish between different transmitters. These address types include MAC-level addresses, a partial AID (Association Identifier), a Group ID (Group Identifier), and a BSS color.

According to the IEEE 802.11 Specifications, a MAC frame may include up to four address fields. The specific usage of these address fields may differ depending on the type of the MAC frame. Commonly used address fields include an RA (Receive Address) field and a TA (Transmit Address) field. For example, in an Acknowledgement MAC control frame, only address field is present, which is used as an RA field and indicates the intended recipient of the Acknowledgement MAC control frame. The partial AID and Group ID fields are part of a PHY (Physical layer) preamble of the WLAN transmissions. The Partial AID is used as a compressed address that allows a receiver to stop processing a packet if the partial AID does not match its own address. This allows for power saving by reduced processing, since the PHY layer may discard the frame early. The BSS color is a simple indicator in a PHY preamble, to be used for enabling spatial reuse of resources.

Due to the above-mentioned various types of address and identification information, wireless sensing based on unsolicited WLAN transmissions may raise privacy and security concerns. In particular, since electromagnetic waves in the frequency ranges used for WLAN transmissions also propagate through windows and walls, an attacker could abuse the wireless sensing functionality to invade privacy of individuals and businesses. For example, a burglar could utilize the wireless sensing by listening to beacons transmitted by one or more APs inside a building to determine whether the building is empty, how many persons are in the building, and where such persons are located.

Accordingly, there is a need for techniques which allow for avoiding security issues associated with wireless sensing functionalities.

SUMMARY

According to an embodiment, a method of controlling wireless transmissions in a wireless communication system is provided. According to the method, based on secured communication in the wireless communication system, a wireless communication device determines a variable association of device identification information to one or more wireless communication devices. Based on the determined association, the wireless communication device controls processing of one or more wireless transmissions comprising the device identification information.

According to a further embodiment, a wireless communication device for a wireless communication system is provided. The wireless communication device is configured to, based on secured communication in the wireless communication system, determine a variable association of device identification information to one or more wireless communication devices. Further, the wireless communication device is configured to, based on the determined variable association, control processing of one or more wireless transmissions comprising the device identification information.

According to a further embodiment, a wireless communication device for a wireless communication system is provided. The wireless communication device comprises at least one processor and a memory. The memory contains instructions executable by said at least one processor, whereby the wireless communication device is operative to, based on secured communication in the wireless communication system, determine a variable association of device identification information to one or more wireless communication devices. Further, the memory contains instructions executable by said at least one processor, whereby the wireless communication device is operative to, based on the determined variable association, control processing of one or more wireless transmissions comprising the device identification information.

According to a further embodiment of the invention, a computer program or computer program product is provided, e.g., in the form of a non-transitory storage medium, which comprises program code to be executed by at least one processor of a wireless communication device is provided. Execution of the program code causes the wireless communication device to, based on secured communication in the wireless communication system, determine a variable association of device identification information to one or more wireless communication devices. Further, execution of the program code causes the wireless communication device to, based on the determined variable association, control processing of one or more wireless transmissions comprising the device identification information.

Details of such embodiments and further embodiments will be apparent from the following detailed description of embodiments.

BRIEF DESCRIPTION OF THE DRAWINGS

FIG. 3 illustrates an example of a PHY preamble of a wireless transmission in the wireless communication system.

FIG. 4 illustrates a further example of a PHY preamble of a wireless transmission in the wireless communication system.

DETAILED DESCRIPTION

Figure 1:
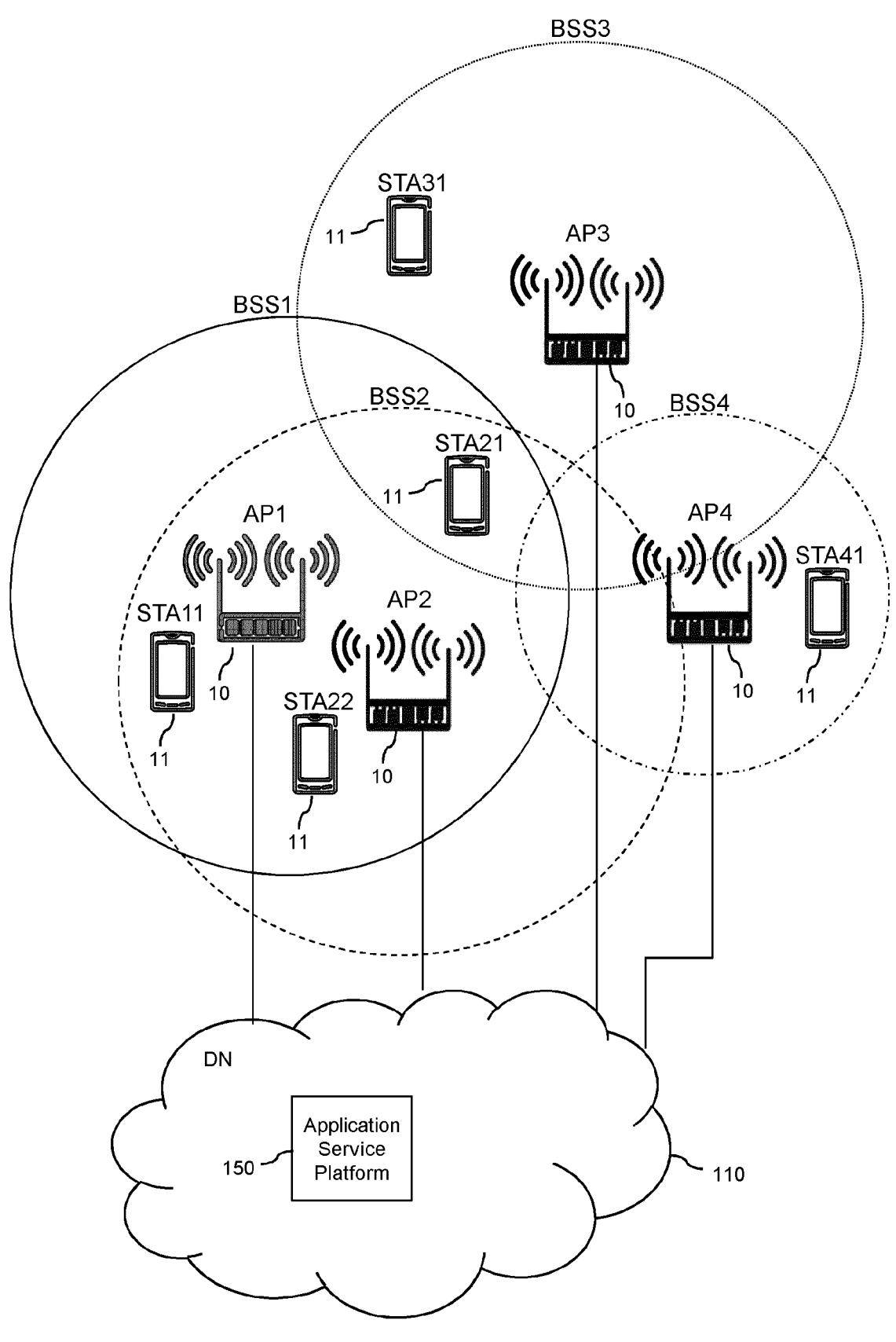
FIG. 1 schematically illustrates a wireless communication system according to an embodiment.

In the following, concepts in accordance with exemplary embodiments of the invention will be explained in more detail and with reference to the accompanying drawings.

The illustrated embodiments relate to controlling of wireless transmissions in a wireless communication system. The wireless communication system may be a WLAN (Wireless Local Area Network) system based on an IEEE 802.11 technology. However, it is noted that the illustrated concepts could also be applied to other wireless communication technologies, e.g., to contention-based modes of the LTE (Long Term Evolution) or NR (Previously presented Radio), or NB IoT (Narrowband Internet of Things) technology specified by 3GPP (3$^{rd}$ Generation Partnership Project). The illustrated concepts may be implemented by various types of wireless communication devices, in particular by Access Points (APs) and/or by non-AP Stations (STAs).

The illustrated concepts, it is considered that wireless sensing functionalities could also be utilized by an attacker, e.g., a device performs wireless sensing to derive characteristics of objects, people or animals in its environment, however without being authorized to do so. The illustrated concepts are based on assuming that the wireless sensing will provide useful results only if the device performing the sensing can consistently identify from which device(s) received wireless transmissions originate, by tracking device identification information included in the wireless transmissions. For example, if at a first point of time the device performing the sensing receives a first wireless transmission indicating a first transmit address (TA) and at a second point of time receives a second wireless transmission indicating the same TA, it can assume that the two wireless transmissions originate from the same transmitter and use this information when evaluating changes of the CSI from the two wireless transmissions. The illustrated concepts involve that the device identification information included in the wireless transmissions is obfuscated by utilizing a variable association of device identification information to wireless communication devices. Due to this variability, the above-mentioned two wireless transmissions can indicate different TAs, even though they originate from the same transmitter. In other scenarios, two wireless transmissions could indicate the same TA, even though they originate from different transmitters. In order to avoid adversely affecting processing of wireless transmissions by their intended recipients, authorized devices are informed about the variable association of the device identification information to the wireless devices, using secured communication in the wireless communication system. The secured communication may for example involve that wireless transmissions are decodable only for authorized devices, e.g., devices having a corresponding cryptographic key or devices which have been admitted for wireless communication. When, for example considering the example of a WLAN system, the authorized devices could be the STAs associated with an AP, which typically also need to be provided with a key for protected access, e.g., according to a WPA (WiFi protected access) mechanism. Further, it could be required that the authorized devices are on a list of MAC addresses admitted by MAC address filtering. Accordingly, the authorized devices are made aware of the variable association of the device identification information to the wireless communication devices and can thus correctly process the wireless transmissions, irrespective of the obfuscation.

FIG. 1 illustrates an exemplary wireless communication system according to an embodiment. In the illustrated example, the wireless communication system includes multiple access points (APs) 10, in the illustrated example referred to as AP1, AP2, AP3, AP4, and multiple stations (STAs) 11, in the illustrated example referred to as STA11, STA21, STA22, STA31, STA32, and STA41. The station STA11 is served by AP1 (in a first BSS denoted as BSS1), the stations STA21 and STA22 are served by AP2 (in a second BSS denoted as BSS2). The stations STA31 and STA32 are served by AP3 (in a third BSS denoted as BSS3). The station STA41 is served by AP4 (in a fourth BSS denoted as BSS4). The stations 11 may correspond to various kinds of wireless devices, for example user terminals, such as mobile or stationary computing devices like smartphones, laptop computers, desktop computers, tablet computers, gaming devices, or the like. Further, the stations 11 could for example correspond to other kinds of equipment like smart home devices, printers, multimedia devices, data storage devices, or the like.

In the example of FIG. 1, each of the stations 11 may connect through a radio link to one of the APs 10. For example depending on location or channel conditions experienced by a given station 11, the station 11 may select an appropriate AP 10 and BSS for establishing the radio link.

Each AP 10 may provide data connectivity of the stations 11 connected to the AP 10. As further illustrated, the APs 10 may be connected to a data network (DN) 110. In this way, the APs 10 may also provide data connectivity of stations 11 connected to different APs 10. Further, the APs 10 may also provide data connectivity of the stations 11 to other entities, e.g., to one or more servers, service providers, data sources, data sinks, user terminals, or the like. Accordingly, the radio link established between a given station 11 and its serving AP 10 may be used for providing various kinds of services to the station 11, e.g., a voice service, a multimedia service, or other data service. Such services may be based on applications which are executed on the station 11 and/or on a device linked to the station 11. By way of example, FIG. 1 illustrates an application service platform 150 provided in the DN 110. The application(s) executed on the station 11 and/or on one or more other devices linked to the station 11 may use the radio link for data communication with one or more other stations 11 and/or the application service platform 150, thereby enabling utilization of the corresponding service(s) at the station 11.

In the following, the illustrated concepts will be described in more detail, by referring to various scenarios which may occur in a wireless communication system as illustrated in FIG. 1. In these explanations, it is assumed that the device identification information includes MAC address information included in a MAC PDU (MAC Protocol Data Unit) and a BSS color or AID in a PHY preamble of the MAC PDU. It is however noted that the illustrated concepts could be applied in a similar manner to only a subset of these information elements, e.g., only to MAC address information or only certain MAC address information, or only to the BSS color or only the partial AID.

Figure 2:
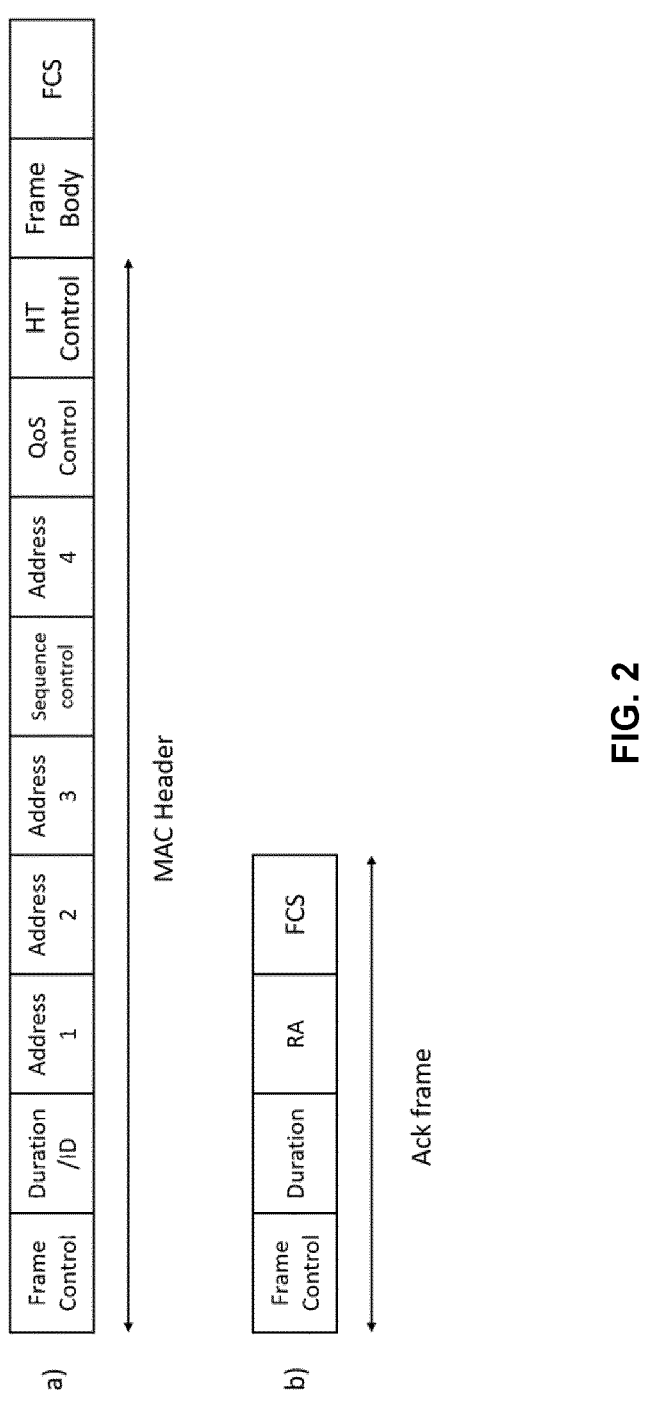
FIG. 2 illustrates examples of MAC frame types of wireless transmissions in the wireless communication system.

FIG. 2 schematically illustrates a frame structure of typical MAC PDUs, in accordance with the IEEE 802.11 Specifications. In particular, FIG. 2 a) illustrates a generic MAC PDU as for example used to convey payload data, and FIG. 2 b) illustrates an Acknowledgement MAC control frame, as used to provide the transmitter of a MAC PDU with feedback indicating that the MAC PDU was successfully received by its intended recipient. As can be seen, in the MAC PDU of FIG. 2 a), the MAC address information includes four address fields in a MAC header. The Acknowledgement MAC control frame includes only one address field, which corresponds to the Address 1 field of the generic MAC PDU and is used as a Receive Address (RA) field.

FIGS. 2 and 3 schematically illustrate exemplary PHY preambles which may be used in the wireless transmissions of the illustrated concepts. In particular, FIG. 3 illustrates a VHT-SIG-A field of a PHY preamble in accordance with the IEEE 802.11 Specifications, which includes a Group ID field and a partial AID field. FIG. 4 illustrates an HT-SIG-A field of a PHY preamble in accordance with the IEEE 802.11 Specifications, which includes a BSS color field.

Figure 5:
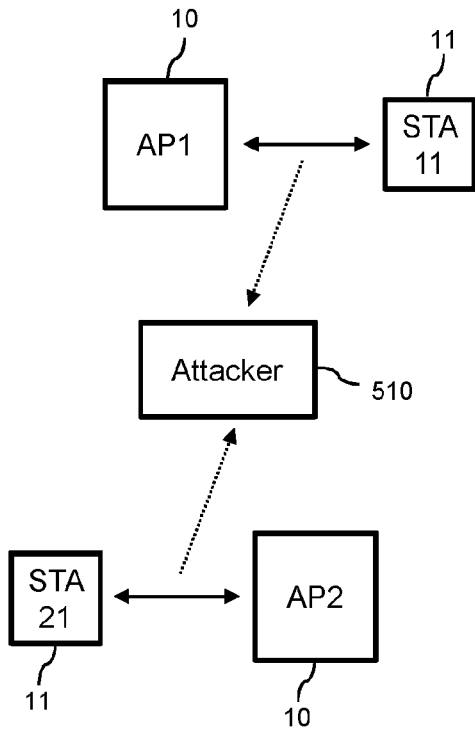
FIG. 5 schematically illustrates an example of an attack scenario in the wireless communication system.

FIG. 5 schematically illustrates an exemplary scenario where an attacker 510 could attempt to utilize wireless sensing to gain information from wireless transmissions between AP1 and STA11 or from wireless transmissions between AP2 and STA21. In the scenario of FIG. 5, it is assumed that STA 11 is associated with AP1 and STA21 is associated with AP2. The attacker is however not associated with AP1 or AP2 and, thus, cannot decode any of these wireless transmissions. The attacker 510 may however read the PHY preambles and MAC headers of the wireless transmissions and detect the included device identification information. Due to the obfuscation, the attacker is however not able to consistently determine whether two wireless transmissions originated from the same transmitter or were addressed to the same recipient. Accordingly, wireless sensing by the attacker 510 is impeded or even rendered impossible. On the other hand, the secured transmission between the AP 10 and its associated STA 11 may be used for conveying information about the variable association, so that regular processing of the wireless transmissions, e.g., in terms of correct addressing, is not adversely affected by the obfuscation.

The variable association of the device identification to the APs and STAs can be organized in various ways.

In some scenarios, the AP may change a mapping of device identification to the AP(s) and STA(s) of the BSS in regular time intervals and/or each time after performing a certain number of wireless transmissions. Before each change, the AP may announce the change to its associated STAs, so that all associated STAs become aware of the change. Then, the changed mapping may be applied in upcoming wireless transmissions between the AP and its associated stations. In such scenarios, the AP would be responsible of keeping its associated STAs aware of the changes in mapping of device identification to the APs and STAs.

In some scenarios, the variable association could also be configured upon association of each STA to the AP: Upon association of a STA to the AP, the AP could announce to the STA a set of device identification information elements, e.g., a set of MAC addresses, which are to be considered as valid for the AP. Then, for every wireless transmission, the AP may select one device identification information element from the set. The selection can be done using various approaches, for example using random selection, a round-robin mechanism, or a combination of random selection and a round-robin mechanism, e.g., by alternating between these two mechanisms, and/or by triggering a new selection in regular or irregular time intervals.

Figures 6, 7A, 7B:
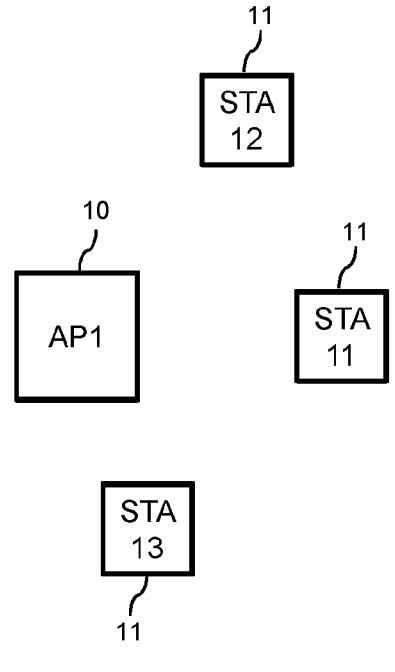
FIG. 6 schematically illustrates an exemplary communication scenario in the wireless communication system.
FIGS. 7A and 7B schematically illustrate address mappings used in the scenario of FIG. 6.

FIG. 6 illustrates an example of a scenario in which the variable association of device identification information to APs and STAs is utilized. The scenario of FIG. 6 involves an AP 10, denoted as AP1, and a number of STAs 11, denoted as STA11, STA12, and STA13. AP1 could for example correspond to AP1 of FIG. 1, STA11 could correspond to STA11 of FIG. 1, and STA12 and STA13 could correspond to additional STAs associated to BSS1.

FIG. 7A shows a transmit address mapping applied by STA11 with respect to its transmitted wireless transmissions, i.e., its transmissions to AP1. As can be seen, a set of addresses $Addr_3$, $Addr_{19}$, $Addr_{20}$, and $Addr_{39}$, is mapped to STA11. Each time when performing a wireless transmission to AP1, STA11 may select one of these addresses and include it into the TA field of the MAC header. The selection may for example be done randomly or sequentially. AP1 is aware of the mapping, i.e., that each address of the set is equivalently valid for STA11, and may thus consistently identify STA11 as the source of the wireless transmissions.

FIG. 7B shows a received address mapping applied by STA11 with respect to its received wireless transmissions. As can be seen, a first set of addresses $Addr_1$, $Addr_{21}$, and $Addr_{45}$ is mapped to AP1. A second set of addresses $Addr_2$, $Addr_9$, is mapped to STA12, and a third set of addresses $Addr_4$, $Addr_{15}$, $Addr_{17}$, and $Addr_{31}$, is mapped to STA13.

The more often the changes occur, the harder it becomes for an attacker to group the received wireless transmissions and reasonably interpret measurements on the received wireless transmissions. On the other hand, more frequent changes also have the potential of increasing complexity. In order to achieve a tradeoff between high security and low complexity, it may be useful to change the mapping of device identification to the AP(s) and STA(s) once with every TXOP (Transmission Opportunity). This may allow for achieving reasonable protection against unauthorized wireless sensing while at the same time facilitating consistent setting of the NAV (Network Allocation Vector) by STAs and/or APs of a neighboring BSS. When an address indicated in a received wireless transmission, e.g., in the RA field, is from the first set, STA11 will know from the variable mapping that the wireless transmission originates from AP1. When an address indicated in a received wireless transmission, e.g., in the RA field, is from the second set, STA11 will know from the variable mapping that the wireless transmission originates from STA12. When an address indicated in a received wireless transmission, e.g., in the RA field, is from the third set, STA11 will know from the variable mapping that the wireless transmission originates from STA13.

The associated STAs may change their utilized device identification information in a corresponding manner. For example, upon detecting a change in the device identification information utilized by the AP, the associated STA may adopt a corresponding change, so that the changes by the AP and the STA become synchronized. This may further impede analysis of the changes in the utilized device identification information by an attacker.

The obfuscation may also be applied to broadcasted messages, such as beacons transmitted by an AP. Here, it needs to be considered that the beacons should remain usable for certain non-associated STAs, e.g., STAs which are about to associate to the AP. Also in this case, the AP may utilize a set of device identification information elements, e.g., a set of MAC addresses, which are valid for the AP and dynamically change between the identification information elements of the set. As in the above example, the set of identification information elements may be known to the STAs which are already associated with the AP, so that the identification information elements of the set are handled as being equivalent. For the STA to be associated, it may appear that the beacons come from different APs, but that is typically irrelevant once the STA has connected to the AP. For an attacker it is however rendered difficult to identify whether two beacons originated from the same AP.

In some scenarios, the change in the utilized device identification information may concern all of the above-mentioned types of device identification information at the same time, or only a part thereof. For example, a transmitting wireless communication device could change both the TA or AID at the same time or change both independently.

In some cases, also the timing of certain wireless transmissions could be used for analysis by an attacker. For example, Acknowledgement MAC frames (ACKs) are typically sent with highest priority, a fixed time interval after the end of the received MAC PDU to be acknowledged. This time interval is also denoted as SIFS (short inter-frame spacing). In some situations, an attacker could identify the transmitter of an ACK by determining the intended recipient of the MAC PDU that ended one SIFS before transmission of the ACK. For this reason, it is beneficial that the obfuscation of the device identifier information is also performed with respect to an RA field of the MAC PDU and/or the AID or partial AID in the PHY preamble. The obfuscation of device identification information related to the intended receiver may also allow for considering attack scenarios where the attacker would be able to detect that only the device identification information related to the transmitter changes, while the device identification information related to the receiver stays the same, and by assuming that a STA is only associated with one AP, the attacker could still determine that the various device identification information corresponds to the same device. This can be avoided by performing the obfuscation for both the device identification information related to the transmitter and the device identification information related to the intended receiver.

Figures 8, 9:
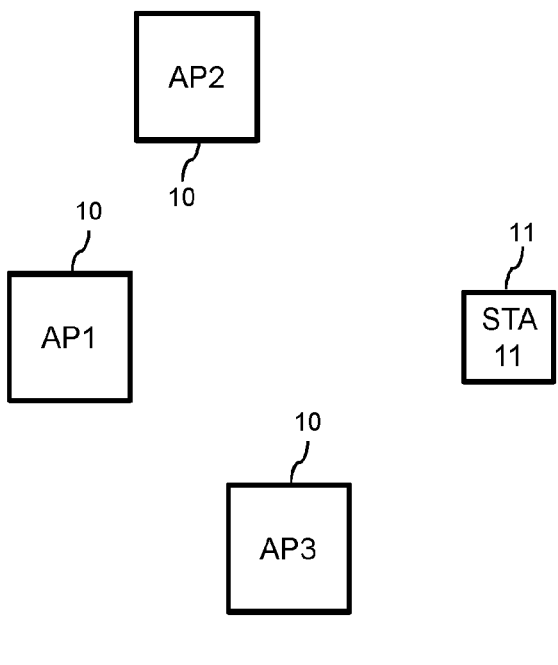
FIG. 8 schematically illustrates a further exemplary communication scenario in the wireless communication system.
FIG. 9 schematically illustrates an address mapping used in the scenario of FIG. 8.

In the above examples, the obfuscation involves that the device identification information mapped to a given AP or STA is changed so that an attacker is impeded in grouping multiple wireless transmissions from the same device together. In addition or as an alternative, it would also be possible to achieve the obfuscation by changing the device which applies certain device identification information. For example, a group of multiple APs could use the same device identification information, e.g., the same BSS ID and same MAC address, but at different points in time. From the perspective of the associated STA(s), the multiple APs could thus act as one AP. Also for an attacker, the APs of the group would appear as one device and group the wireless transmissions from or to these APs together. However, for wireless sensing purposes, this grouping would deliver inconsistent measurement results. FIG. 8 schematically illustrates a corresponding scenario.

The scenario of FIG. 8 involves a group of APs 10, denoted as AP1, AP2, and AP3, a STA 11, denoted as STA11. AP1, AP2, and AP3 could for example correspond to AP1 of FIG. 1, and STA11 could correspond to STA11 of FIG. 1.

FIG. 9 shows an address mapping applied for AP1, AP2, and AP3, for controlling which device identification information is to be used in wireless transmissions from the APs and to the APs, e.g., in the TA field or in the RA field. As can be seen, a set of addresses $Addr_1$, $Addr_2$, $Addr_3$, and $Addr_4$, is mapped to AP1, and the mapping is defined in a time-dependent manner so that $Addr_1$ as valid for time $t_1$, $Addr_2$ is valid for time $t_2$, $Addr_3$ is valid for time $t_3$, and $Addr_4$ is valid for time $t_4$. The same set of addresses $Addr_1$, $Addr_2$, $Addr_3$, and $Addr_4$, is also mapped to AP2, however with a different time-dependency so that $Addr_2$ as valid for time $t_1$, $Addr_3$ is valid for time $t_2$, $Addr_4$ is valid for time $t_3$, and $Addr_1$ is valid for time $t_4$. Further, the same set of addresses $Addr_1$, $Addr_2$, $Addr_3$, and $Addr_4$, is also mapped to AP3, however with a further different time-dependency so that $Addr_3$ as valid for time $t_1$, $Addr_4$ is valid for time $t_2$, $Addr_1$ is valid for time $t_3$, and $Addr_2$ is valid for time $t_4$. The times $t_1$, $t_2$, $t_3$, and ta may for example be defined in terms of a point in time when the mapping is to be changed, or time intervals when the mapping is valid. The association of the same address to different APs thus changes in a cyclic manner.

For a group of STAs, the use of the same address by different STAs of the group at different times can be implemented in a corresponding manner.

The variable association of the device identification information to the STAs and APs may be configured in various ways. In some scenarios, the AP may send configuration information to the STAs and this configuration information may indicate a mapping of device identification information to STAs and APs and how the mapping is to be changed. The configuration may for example include a set of addresses that are used for the same STA or AP, the type of device identification information, e.g., address field, to which the addresses are to be applied, the type of MAC frames in which the addresses and changes are to be applied, when and how often the changes are to be applied, an order of applying the changes, a mode of applying the changes, e.g., randomly or sequentially. Such configuration information could be used for configuring the variable association in a semi-static manner, e.g., upon association of a STA to the AP.

In some variants, the configuration of the variable association may also involve signaling of individual changes, e.g., immediately before the change is to be applied. Such signaling may for example involve that, for the upcoming change, the AP sends configuration information indicating the mapping of device identification information to STAs and APs to be applied in upcoming wireless transmissions, e.g., in terms of a new address, when to change to the new address, and/or for how long the new address is expected to be valid. The latter timing related information may help to ensure that the STA has sufficient time to prepare for the change and/or to consider that that there could be other upcoming changes which need to be taken into account.

In some scenarios, certain wireless transmissions could be exempted from the changes in the applied device identification information, e.g., with the aim of avoiding impact on critical communication. Such wireless transmissions could for example include RTS frames, CTS frames, broadcast frames, CSA (Channel Switch Announcement) frames, or the like. Such types of wireless transmissions to be exempted could also be indicated by the above-mentioned configuration information.

The functionality of performing the obfuscation may also be indicated in capability signaling between the AP and the STA(s). For example, the capability could be indicated in a beacon transmitted by ab AP or in a wireless transmission transmitted by the STA when associating to the AP. In some cases, since beacons could also be decodable for an attacker, the capabilities could be indicating in signaling performed after association of the STA to the AP, based on encrypted or otherwise secured transmission.

In some scenarios, the variable association of device identification to APs and STAs may also be combined with changes in channel frequencies used for the wireless transmissions. This may allow for achieving an even stronger obfuscation. The changes of the channel frequencies may for example involve changing the channel frequency to be used for a wireless transmission to another frequency or swapping a primary channel and a secondary channel. The changes in the channel frequency could for example be configured to be applied with each change of the mapping of the device identification to APs and STAs, or with certain changes of the mapping of the device identification to APs and STAs.

Figure 10:
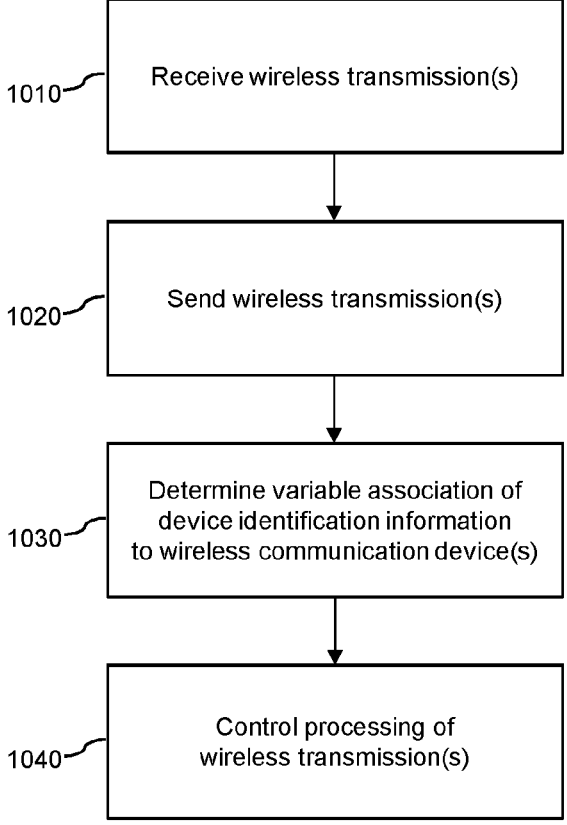
FIG. 10 shows a flowchart for schematically illustrating a method according to an embodiment.

FIG. 10 shows a flowchart for illustrating a method, which may be utilized for implementing the illustrated concepts. The method of FIG. 10 may be used for implementing the illustrated concepts in a wireless communication device. The wireless communication device may be an AP of a wireless communication system, such as one or the above-mentioned APs 10. In some scenarios, the wireless communication device may be a wireless station, in particular a non-AP STA, such as one or the above-mentioned STAs 11. The wireless communication system may be based on a WLAN technology, e.g., according to the IEEE 802.11 standards family.

If a processor-based implementation of the wireless device is used, at least some of the steps of the method of FIG. 10 may be performed and/or controlled by one or more processors of the wireless device. Such wireless device may also include a memory storing program code for implementing at least some of the below described functionalities or steps of the method of FIG. 10.

At step 1010, the wireless communication device may receive one or more wireless transmission(s). The received wireless transmission(s) may for example be part of secured communication between an AP and a STA associated with the AP. The communication may for example be secured by encryption, e.g., based on a WPA mechanism.

At step 1020, the wireless communication device may send one or more wireless transmissions. The sent wireless transmission(s) may for example be part of secured communication between an AP and a STA associated with the AP. The communication may for example be secured by encryption, e.g., based on a WPA mechanism.

At step 1030, the wireless communication device determines a variable association of device identification information to one or more wireless communication devices. The one or more wireless communication devices may include at least one AP of the wireless communication system and/or at least one non-AP STA of the wireless communication system. These AP(s) and non-AP STA(s) could also include the wireless communication device itself, i.e., step 1030 could involve that the wireless communication device determines a variable association of device identification information to the wireless communication device.

Step 1030 involves that the wireless communication device determines the variable information based on secured communication in the wireless communication system, e.g., based on the wireless transmission(s) received at step 1010 and/or based on the wireless transmission(s) sent at step 1020. For example, such wireless transmissions could convey configuration information indicating at least a part of the variable mapping, e.g., as illustrated in FIG. 7A, FIG. 7B, or FIG. 9.

Accordingly, in some scenarios the secured communication may involve that the wireless communication device sends a wireless transmission comprising configuration information indicating the association and/or that the wireless communication device receives a wireless transmission comprising configuration information indicating the association.

In some scenarios, the variable association may indicate, for a first time, a mapping of first identification information to the one or more wireless communication devices and, for a second time, a mapping of second identification information to the one or more wireless communication devices e.g., as illustrated in FIG. 9.

In some scenarios, the variable association may indicate a mapping of the same identification information to two or more of the wireless communication devices, e.g., as illustrated in FIG. 9.

In some scenarios, the variable association may indicate, for a first time, a mapping of the same identification information to a first one of the two or more wireless communication devices and, for a second time, a mapping of the same identification to a second one of the two more wireless communication devices e.g., as illustrated in FIG. 9.

In some scenarios, the wireless communication device may determine the variable association based on random selection, e.g., among multiple valid device identification information elements.

At step 1040, the wireless communication device controls processing of one or more wireless transmissions comprising the device identification information. This is accomplished based on the variable association determined at step 1030. For example, for a wireless transmission transmitted by the wireless communication device, the controlling of the processing at step 1040 may involve inserting the device identification into the wireless transmission to identify a transmitter and/or an intended receiver of the wireless transmission. For a wireless transmission received by the wireless communication device, the controlling of the processing at step 1040 may involve interpreting the device identification included in the wireless transmission to identify a transmitter and/or an intended receiver of the wireless transmission.

Accordingly, in some scenarios, addressing of at least one of the one or more wireless transmissions is based on the device identification information. In such cases, at least one of the one or more wireless transmissions may include the device identification information in a transmitter address (TA) field of the wireless transmission. The TA field can for example be part of a MAC header of the wireless transmission, e.g., as illustrated in FIG. 2 a) or b). Alternatively or in addition, at least one of the one or more wireless transmissions may include the device identification information in a receiver address (RA) field of the wireless transmission. The RA field can for example be part of a MAC header of the wireless transmission, e.g., as illustrated in FIG. 2 a) or b). In some scenarios, at least one of the one or more wireless transmissions may include the device identification information in a Physical lay (PHY) preamble of the wireless transmission, e.g., in a Group ID field or AID field as illustrated in FIG. 3 or in a BSS color field as illustrated in FIG. 4.

The one or more wireless transmissions for which processing is controlled at step 1040 may include at least one broadcast transmission, e.g., a beacon, at least one transmission of payload data, e.g., a MAC PDU conveying payload data in a Frame Body as illustrated in FIG. 2a), and/or at least one transmission of feedback for indicating whether a wireless transmission was successfully received, e.g., an Acknowledgement MAC control frame as illustrated in FIG. 2b).

In some scenarios, the variable association determined at step 1030 may depend on a type of the wireless transmission including the device identification information. For example, certain types of wireless transmission, e.g., associated with critical communication, could be exempted from application of the variable association or could utilize other settings of the variable association.

Figure 11:
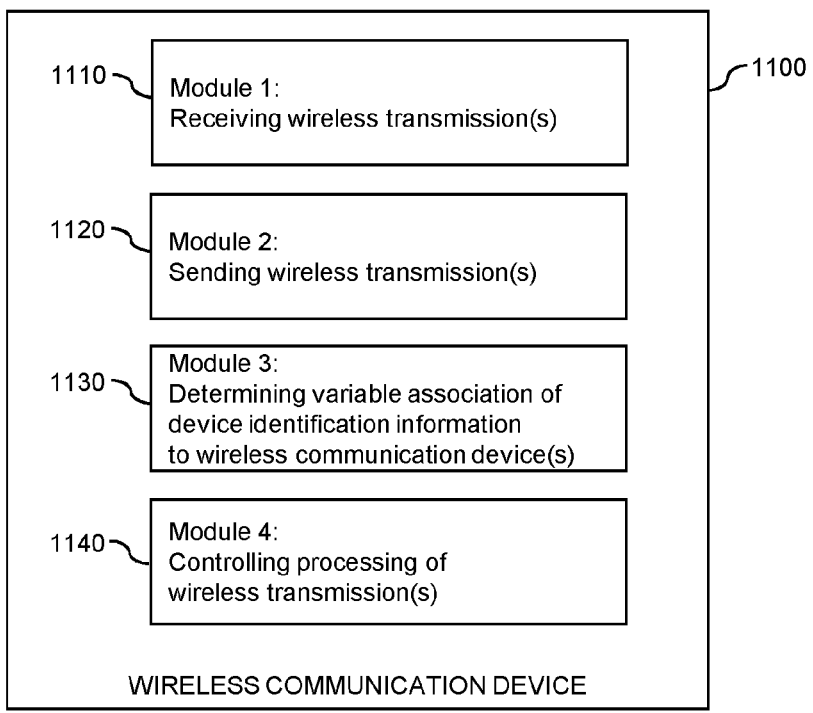
FIG. 11 shows a block diagram for schematically illustrating functionalities of a wireless communication device according to an embodiment.

FIG. 11 shows a block diagram for illustrating functionalities of a wireless communication device 1100 which operates according to the method of FIG. 10. The wireless communication device 1100 may for example correspond to one of above-mentioned APs 10 or STAs 11. As illustrated, the wireless communication device 1100 may be provided with a module 1110 configured to receive one or more wireless transmissions, such as explained in connection with step 1010. Further, the wireless communication device 1100 may be provided with a module 1120 configured to send one or more wireless transmissions, such as explained in connection with step 1020. Further, the wireless communication device 1100 may be provided with a module 1130 configured to determine a variable association of device identification information to one or more wireless devices, such as explained in connection with step 1030. Further, the wireless communication device 1100 may be provided with a module 1140 configured to control processing of a wireless transmission, such as explained in connection with step 1040.

It is noted that the wireless communication device 1100 may include further modules for implementing other functionalities, such as known functionalities of a WLAN AP or known functionalities of a non-AP WLAN STA. Further, it is noted that the modules of the wireless communication device 1100 do not necessarily represent a hardware structure of the wireless communication device 1100, but may also correspond to functional elements, e.g., implemented by hardware, software, or a combination thereof.

Figure 12:
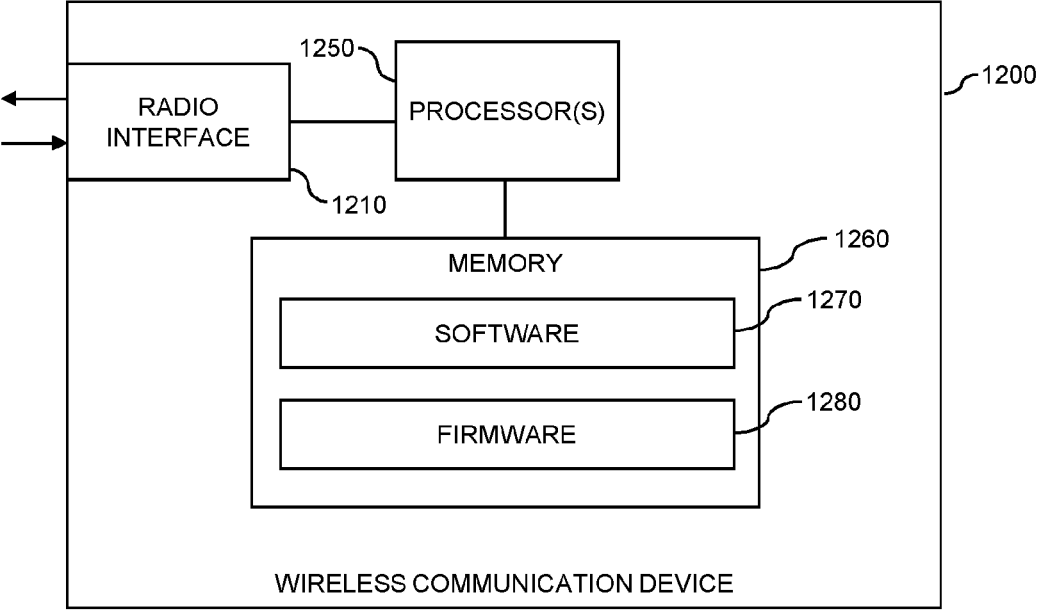
FIG. 12 schematically illustrates structures of a wireless communication device according to an embodiment.

FIG. 12 illustrates a processor-based implementation of a wireless communication device 1200 which may be used for implementing the above-described concepts. For example, the structures as illustrated in FIG. 12 may be used for implementing the concepts in any of the above-mentioned APs 10 or STAs 11.

As illustrated, the wireless communication device 1200 includes one or more radio interfaces 1210. The radio interface(s) 1210 may for example be based on a WLAN technology, e.g., according to an IEEE 802.11 family standard. However, other wireless technologies could be supported as well, e.g., the LTE technology or the NR technology. In some scenarios, the radio interface(s) 1210 may be based on multiple antennas of the wireless communication device 1200 and support beamformed multi-antenna port transmission to enable spatial multiplexing of wireless transmissions.

Further, the wireless communication device 1200 may include one or more processors 1250 coupled to the radio interface(s) 1210 and a memory 1260 coupled to the processor(s) 1250. By way of example, the radio interface(s) 1210, the processor(s) 1250, and the memory 1160 could be coupled by one or more internal bus systems of the AP 1200. The memory 1260 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1260 may include software 1270 and/or firmware 1280. The memory 1260 may include suitably configured program code to be executed by the processor(s) 1250 so as to implement the above-described functionalities for controlling wireless transmissions, such as explained in connection with FIGS. 10 and 11.

It is to be understood that the structures as illustrated in FIG. 12 are merely schematic and that the wireless communication device 1200 may actually include further components which, for the sake of clarity, have not been illustrated, e.g., further interfaces or further processors. Also, it is to be understood that the memory 1260 may include further program code for implementing known functionalities of a WLAN AP or WLAN STA. According to some embodiments, also a computer program may be provided for implementing functionalities of the wireless communication device 1200, e.g., in the form of a physical medium storing the program code and/or other data to be stored in the memory 1260 or by making the program code available for download or by streaming.

As can be seen, the concepts as described above may be used for efficiently addressing privacy or security risks arising from wireless sensing functionalities. In particular, utilization of such wireless sensing functionalities by an attacker can be impeded or prevented by obfuscating device identification information included in wireless transmissions, while at the same time enabling authorized devices to process the wireless transmission in a consistent manner.

It is to be understood that the examples and embodiments as explained above are merely illustrative and susceptible to various modifications. For example, the illustrated concepts may be applied in connection with various kinds of wireless technologies, without limitation to WLAN technologies. Further, the concepts may be applied with respect to various types of APs and wireless stations. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling wireless communication in a Wireless Local Area Network (WLAN), the method comprising:

based on secured communication in the WLAN, an access point (AP) determining a variable association of device identification information to two or more wireless stations, wherein said secured communication includes configuration information indicating, for a first time, a first mapping of the device identification information to a first one of the wireless stations and, for a second time, a second mapping of the device identification information to a second one of the wireless stations; and based on the variable association, a wireless communication device controlling processing of:

one or more wireless transmissions by the AP, wherein the device identification information is comprised in a receiver address field of the wireless transmission, and/or one or more wireless transmissions received by the AP, wherein the device identification information is comprised in a transmitter address field of the wireless transmission.

2. The method according to claim 1, wherein the variable association indicates, for the first time, a mapping of first identification information to the wireless stations and, for the second time, a mapping of second identification information to the wireless stations.

3. The method according to claim 1, wherein at least one of the one or more wireless transmissions transmitted or received by the AP comprises the device identification information in a physical layer preamble of the wireless transmission.

4. The method according to claim 1, further comprising:

determining the variable association based on random selection.

5. The method according to claim 1, wherein the one or more wireless transmissions transmitted or received by the AP comprise at least one broadcast transmission.

6. The method according to claim 1, wherein the one or more wireless transmissions transmitted or received by the AP comprise at least one transmission of payload data.

7. The method according to claim 1, wherein the one or more wireless transmissions transmitted or received by the AP comprises at least one transmission of feedback for indicating whether a wireless transmission was successfully received.

8. The method according to claim 1, wherein the variable association depends on a type of the wireless transmission transmitted or received by the AP comprising the device identification information.

9. A wireless communication device for operation in a wireless communication system, the wireless communication device comprising:

at least one processor; and a memory containing program code executable by the at least one processor, whereby execution of the program code by the at least one processor causes the wireless communication device to:

based on secured communication in the wireless communication system, determine a variable association of device identification information to two or more wireless stations, wherein said secured communication includes configuration information indicating, for a first time, a first mapping of the device identification information to a first one of the wireless stations and, for a second time, a second mapping of the device identification information to a second one of the wireless station; and based on the variable association, control processing of:

one or more wireless transmissions by an AP wherein the device identification information is comprised in a receiver address field of the wireless transmission, and/or one or more wireless transmission received by the AP, wherein the device identification information is comprised in a transmitter address field of the wireless transmission.

* * * * *